US011440263B2

(12) United States Patent
Gmeiner et al.

(10) Patent No.: US 11,440,263 B2
(45) Date of Patent: Sep. 13, 2022

(54) SYSTEM FOR THE LITHOGRAPHY-BASED ADDITIVE MANUFACTURING OF THREE-DIMENSIONAL (3D) STRUCTURES (71) Applicant: Cubicure GmbH, Vienna (AT)

(72) Inventors: Robert Gmeiner, Vienna (AT); Thomas Förster-Romswinckel, Pixendorf (AT); Philipp Neubauer, Fahrafeld (AT); Bernhard Busetti, Vienna (AT); Wolfgang Steiger, Vienna (AT); Raphael Krobath, Breitenfurt (AT)

(73) Assignee: CUBICURE GMBH, Vienna (AT)

( * ) Notice: Subject to any disclaimer, the term of this patent is extended or adjusted under 35 U.S.C. 154(b) by 130 days.

(21) Appl. No.: 16/725,056

(22) Filed: Dec. 23, 2019

(65) Prior Publication Data

US 2021/0187859 A1 Jun. 24, 2021

(51) Int. Cl.
*B29C 64/393* (2017.01)
*B33Y 10/00* (2015.01)
*B33Y 30/00* (2015.01)
*B33Y 50/02* (2015.01)
*B29C 64/264* (2017.01)
*B29C 64/227* (2017.01)
*B29C 64/129* (2017.01)

(52) U.S. Cl.
CPC .......... *B29C 64/393* (2017.08); *B29C 64/129* (2017.08); *B29C 64/227* (2017.08); *B29C 64/264* (2017.08); *B33Y 10/00* (2014.12); *B33Y 30/00* (2014.12); *B33Y 50/02* (2014.12)

(58) Field of Classification Search
CPC ... B29C 64/393; B29C 64/264; B29C 64/227; B29C 64/129; B33Y 10/00; B33Y 30/00; B33Y 50/02
See application file for complete search history.

(56) References Cited

U.S. PATENT DOCUMENTS

2017/0066185 A1    3/2017 Ermoshkin et al.

FOREIGN PATENT DOCUMENTS

| DE | 102018112381 A1 * | 12/2018 | ............... B22F 10/30 |
| EP | 3418033 A1 | 12/2018 | |
| WO | WO-9848997 A1 * | 11/1998 | ........... B29C 64/135 |
| WO | WO-2010074566 A1 * | 7/2010 | ........... B29C 64/129 |
| WO | WO-2012174332 A1 * | 12/2012 | ............. B33Y 30/00 |

(Continued)

*Primary Examiner* — Yung-Sheng M Tsui
*Assistant Examiner* — Melody Tsui
(74) *Attorney, Agent, or Firm* — Pillsbury Winthrop Shaw Pittman, LLP (57) ABSTRACT A device for the lithography-based additive manufacturing of three-dimensional structures may comprise a building platform defining a building plane, a light engine designed for the dynamic patterning of light in an exposure field of said light engine, a material transport unit comprising a first drive mechanism for transporting a material layer across the exposure field, a second drive mechanism for causing relative movement of the light engine and the building platform along a displacement path extending parallel to the building plane, a linear encoder for sensing a position and/or a velocity of the light engine relative to the building platform, and/or one or more control units configured to adjust the feeding rate of a pattern data feeder based on the position or the velocity sensed by the linear encoder.

15 Claims, 6 Drawing Sheets (56) References Cited

FOREIGN PATENT DOCUMENTS

| WO | WO-2016201309 A1 | * | 12/2016 | ......... B23K 26/0604 |
| WO | 2017/006173 A1 | | 1/2017 | |
| WO | WO-2018109734 A2 | * | 6/2018 | ........... B29C 64/314 |
| WO | 2019/213585 A1 | | 11/2019 | |
| WO | 2019/213588 A1 | | 11/2019 | |

* cited by examiner

SYSTEM FOR THE LITHOGRAPHY-BASED ADDITIVE MANUFACTURING OF THREE-DIMENSIONAL (3D) STRUCTURES

TECHNICAL FIELD

The technical field relates to systems and methods for lithography-based additive manufacturing three-dimensional (3D) structures.

BACKGROUND

Many additive manufacturing (AM) processes for polymers deal with the challenge of combining high surface quality as well as small feature resolution with good thermo-mechanical material properties. Stereolithography (SLA) is a promising candidate for manufacturing items with features where a high degree of accuracy is desired. Some SLA processes use large photopolymer resin vats, in which a building platform and the layers of the structure already printed on the building platform are submerged during the printing process. In these systems, new layers are added on top of each other at the surface of the liquid resin. Different light sources are typically used in order to induce photopolymerization of the liquid photopolymer resin layer. As an example, Digital Light Processing (DLP), other active mask projection systems, and/or laser-scanner based systems may be used to selectively project light information on the surface of the photopolymer resin. These printing concept(s) advantageously allow use of large resin vats and often result in large building areas.

However, generating a thin layer of resin between a submerged structure and the free surface of the liquid resin bath is limited in accuracy (e.g. regarding the liquid layer thickness) due to a variety of factors, including the viscosity and/or surface tension phenomena of the resin formulation used. Further, feature accuracy is typically limited when large building areas are used—even if laser/scanner systems are used. Optical limitations of the scanner lens construction, timing limitations of the traditionally used pulse laser sources as well as large deviation angles of the scanning field result in accuracy limitations of the whole printing process and accuracy shifts between the center and the edge of the building area. Another very important issue is the need for significant amounts of photopolymer material before a printing job can be started (e.g. vat filling procedure). As photopolymer resins can become chemically unstable, resin storage and degradation as well as cleaning a large resin vat can become an economical problem and limits the process stability over time.

Some stereolithographic approaches use vat-based concepts, where a liquid resin is filled into a transparent material vat. According to these approaches, a layer of the liquid resin is irradiated by selective light information from below, e.g., through the bottom of the material vat, so that the printed components are generated upside-down, sticking to a so-called building platform. These systems present some advantages, such as the possibility of mechanically adjusting the resin layer height by lowering the building platform into the resin vat. By doing so, layers of resin with desired thicknesses (e.g., thin layers of resin) and/or products with features of desired resolutions (e.g., products with high feature resolution (e.g., resolutions desired of various industrial, production applications, including resolutions desirable for mass-production of medical devices, such as dental appliances and/or aligners)) have become possible. However, many such systems are limited in their maximum printing area. As the building platform is lowered into a resin bath, generating the desired layer thickness, residual resin has to be pressed out of a narrowing gap. As this process is characterized by a two-dimensional plate-to-plate press phenomenon, the pressure in the gap often rises in relation to (e.g., by the square of) the printing area. Further, in many instances, such a layer may have to be separated from the bottom of the material vat after photopolymerization. This process again can generate strong forces depending on the size of the printed area. The concept itself may be limited in the physical dimensions of the printed components.

To at least partially overcome the problems connected with the plate-to-plate SLA concepts, different solutions have been suggested: European Patent Publication EP 3418033 A1, entitled "Method and Device for Lithography-Based Generative Production of Three-Dimensional Forms" to Gmeiner et al., describes a process, in which a transparent material supporting element is coated with a thin layer of photopolymer resin so that less material has to be pushed out of the layer gap as the building platform is lowered into the liquid material layer. By precisely heating such a material supporting element, even photopolymer formulations of various viscosities (e.g., high viscous photopolymer formulations) can be processed. By using optimized surface materials or linings for such a material supporting element, separation forces between the newly printed layer and the supporting element can be further reduced.

Some concepts (e.g., the concepts described in United States Patent Publication Number US 2017/0066185 A1, entitled "Method and apparatus for three-dimensional fabrication" to Ermoshkin et al.) comprise an oxygen permeable membrane to generate a so-called 'dead zone' between a material supporting element and the resin, where photopolymerization is chemically prevented due to oxygen molecules. However, the chemical stability of such dead zones can be difficult to control, so that this technology is not suitable for many industrial production processes, in which it may be desirable for a composition to be stable in its quality over time.

According to U.S. Pat. Pub. No. US 2017/0066185 A1, a carrier film is used to transport a layer of liquid resin into a process zone, wherein the carrier film is transparent to the radiation that is used for polymerizing the resin layer. The radiation source that is used for irradiating the resin layer is moved along the length of the building platform as the layer of liquid material carried by the carrier film gradually gets into contact with the building platform. Thus, the contacting zone together with the exposure zone of the radiation source moves along the length of the building platform so that a large area can be printed by means of a relatively small, movable print head. Due to the print head being moved relative to the building platform, the system disclosed in US 2017/0066185 A1 involves the risk of positioning errors along the displacement path of the print head, resulting in respective structuring errors, as well as the risk of misalignments between superimposed layers. Further, such a dynamic system complicates the control of the exposure time so as to provide enough exposure for obtaining solidification of the photopolymer resin material.

This may be true when additionally considering the specific requirements posed by various photopolymers, such as photopolymer formulations that can be 3D printed and/or are suitable for use in industrial/mass production applications of medical devices, such as dental appliances and/or aligners. A further challenge when printing photopolymers with improved thermomechanical properties is related to the relatively low reactivity of such resins. Most SLA resin formulations contain a large fraction of di- or multifunctional monomers or oligomers. The high content of reactive groups (e.g. double bonds in acrylate- or methacrylate groups) may lead to an early gel-point of the formulation. This means that even at a relatively low rate of double-bond-conversion (sometimes 15-30%), the liquid resin gels and becomes solid and strong enough so that a fresh layer can be recoated without undermining structural integrity of a prior layer (e.g., without destroying and/or deforming a previous layer). In such a case only a very short light pulse is needed (e.g. by scanning a laser beam over the surface) to provide exposure until the material cures beyond a specified amount (e.g., exposure for a sufficient amount of solidification). The remaining uncured double-bonds can be converted by a post-curing step, leading finally to a highly cross-linked polymer. Such highly cross-linked polymers may exhibit a high glass transition temperature (Tg), but may suffer from low toughness due to the covalent network and are therefore only of limited use for industrial and/or mass production applications, such as mass-production of medical devices, such as dental appliances and/or aligners.

In contrast, resins with lower amount of multi-functional monomers yield polymer networks with fewer cross-links, improving the toughness of the polymer, but decreasing the glass-transition temperature to lower temperatures. To obtain a high toughness as well as high glass transition temperature, photopolymer formulations with a low amount of multi-functional monomers in combination with monomers or oligomers with strong secondary bonds (e.g. hydrogen bonds, Van der Waals bonds) and large molecular weight can be used. The strong secondary bonds increase the glass-transition temperature and the stiffness of the final polymer network, and the oligomers with high molecular weight (long chains) increase the elongation at break and in further consequence the toughness of the material. Such a photopolymer network thus provides similar thermo-mechanical properties like thermoplastic materials that are currently processed by injection molding and used in a large variety of engineering applications.

The challenge for processing such lowly cross-linked photopolymer networks with strong secondary bonds is twofold: The low content of reactive groups may lead to a delayed gel point, and the strong secondary bonds in combination with high molecular weight oligomers increase the viscosity of the formulation significantly, leading to formulations which cannot be processed with state-of-the art systems for lithography-based AM.

SUMMARY

The implementations described herein provide device(s) and method(s) for the lithography-based additive manufacturing of three-dimensional (3D) structures that is suitable for processing lowly cross-linked photopolymer networks with strong secondary bonds. In particular, the device(s) and/or method(s) described herein enable the precise manufacturing of 3D-structures on a large building platform, the printing area of which is a multiple of the exposure field of the light engine. Further, the device(s) and/or methods described herein allow for precise control of exposure time(s) so as to provide enough exposure for obtaining solidification of the photopolymer resin material. In some embodiments, the exposure time provides exposure until the material cures beyond a specified amount (e.g., exposure for a sufficient amount of solidification). This could be exposure to bring the material to a solid state, exposure to cause the material to fully and/or partially cure beyond a threshold, etc.

The implementations described herein further provide a stable and continuous additive manufacturing process for photopolymer substances (unfilled and filled photopolymer resins), which at the same time provides high printing accuracy, a large process flexibility as regards the chemical composition of the photopolymer resin, high production stability, high autonomy and an overall process concept which is physically scalable without significantly changing the printing parameters. The targeted photopolymers described herein provide excellent thermo-mechanical properties, supporting a printing process which is capable of processing resins with low reactivity, low crosslink-density, a delayed gel-point and high viscosity.

In light of these and other objects, the implementations described herein provide a device for the lithography-based additive manufacturing of three-dimensional structures, the device comprising:
a building platform defining a building plane,
a light engine designed for the dynamic patterning of light in an exposure field of said light engine,
a material transport unit comprising first drive means for transporting a material layer across the exposure field,
second drive means for causing relative movement of the light engine and the building platform along a displacement path extending parallel to the building plane,
first control means adapted for controlling said first and second drive means so that there is no relative movement of the material layer and the building platform in said exposure field during said relative movement of the light engine relative to the building platform,
pattern data feeding means for feeding a sequence of pattern section data to the light engine at an adjustable feeding rate for causing the light engine to emit a sequence of pattern sections at said feeding rate during said relative movement of the light engine and the building platform along the displacement path,
a linear encoder for sensing a position and/or a velocity of the light engine relative to the building platform,
second control means for adjusting the feeding rate of the pattern data feeding means based on the position or the velocity sensed by the linear encoder.

A device may comprise:
a building platform defining a building plane,
a light engine designed for the dynamic patterning of light in an exposure field of said light engine,
a material transport unit comprising a first drive mechanism for transporting a material layer across the exposure field,
a second drive mechanism for causing relative movement of the light engine and the building platform along a displacement path extending parallel to the building plane,
a first control unit adapted for controlling the first and second drive mechanisms so that there is no relative movement of the material layer and the building platform in said exposure field during said relative movement of the light engine relative to the building platform,
a pattern data feeder for feeding a sequence of pattern section data to the light engine at an adjustable feeding rate for causing the light engine to emit a sequence of pattern sections at said feeding rate during said relative movement of the light engine and the building platform along the displacement path, a linear encoder for sensing a position and/or a velocity of the light engine relative to the building platform, a second control unit for adjusting the feeding rate of the pattern data feeder based on the position or the velocity sensed by the linear encoder.

"Pattern data," as used herein, may include data provided to a light source (e.g., a light engine) that causes the light engine to selectively cure material on a building platform according to a specified pattern.

In some embodiments, a three-dimensional (3D) printer system is provided. A 3D printer system may include a build platform that defines a building plane. A material transport unit of the 3D printer system may include a carrier film. The carrier film may have one or more surfaces that receive and/or move photopolymer resins, as described herein. As noted herein, the carrier film may comprise a continuous/endless carrier system. The 3D printing system may include a nozzle or other device to eject photopolymer resin onto the carrier film. The nozzle/other device may create one or more material layer(s) of the photopolymer resin. In some embodiments, the nozzle/other device is configured to eject enough resin to create a single material layer of photopolymer resin on the carrier film.

A 3D printing system may include devices to maintain material layers of photopolymer resin at a specified thickness. As an example, a 3D printing system may include coating blades configured to maintain material layers that have been ejected from a nozzle onto a carrier film at a specified thickness. The coating blades may be adjustable in a direction orthogonal to the carrier film so that the thickness of material layers deposited on the carrier film can be adjusted. In some embodiments, a 3D printing system includes devices to mix material layers of photopolymer resin in a coating zone on the carrier film. Examples of such devices include scrapers, mixers, etc.

A 3D printing system may include material management units configured to perform structuring, placement, subtraction, or some combination thereof, to the one or more material layers. The material management units may include, e.g., robotic arms, sensors configured to sense the one or more material layers, etc.

The 3D printing system may include a light engine that is configured to provide light to cure the photopolymer resin. The light engine may include a light source and may include/be coupled to power sources that power the light source. An exposure field associated with the light engine may allow the light engine to expose light from the light engine to at least a part (possibly all) of the build platform. In some embodiments, the exposure field is associated with a window or other area that is substantially transparent to light from the light source. One or more sensors may sense attributes, such as position, velocity, acceleration, angular motion, etc. of a light engine relative to the building platform. The sensors may include linear encoders, calibrators, and/or other devices that sense attributes of the light engine relative to the building platform. In some embodiments, the sensors take optical measurements of the light engine.

In some embodiments, a 3D printing system includes a pattern data feeder configured to feed pattern section data to the light engine at a feeding rate in order to cure parts of material layers according to the pattern section data at a feeding rate (e.g., an adjustable feeding rate). The light engine may be configured to emit sequences of pattern sections at a feeding rate (e.g., an adjustable feeding rate) when the one or more of the light engine and the building platform move relative to each other along a displacement path. The pattern data feeder may receive instructions from one or more control units as discussed herein.

A 3D printing system may include one or more drive mechanisms that are configured to move the components of the 3D printing system relative to one another. A "drive mechanism," as used herein, may include a device configured to move an item and may include actuators, transducers, electrical components, etc. The drive mechanism(s) of a 3D printing system may be configured to transport material layers toward a build platform, an exposure field, and/or other areas of a 3D printing system. In some embodiments, the drive mechanism(s) include a first drive mechanism that moves the material transport unit, the light engine, and/or the build platform relative to one another. The first drive mechanism may be configured to transport one or more material layers (e.g., those that have been formed from photopolymer resin ejected from the nozzle) toward the exposure field of the light engine and/or parts of the build platform. In some embodiments, the first drive mechanism may be configured to rotate a conveyor or other structure on the carrier film toward the exposure field and/or build platform. The first drive mechanism may include rollers, such as tension rollers, adjustable rollers, and/or other devices configured to manage tension in the carrier film.

The drive mechanism(s) of a 3D printing system may be configured to move the light engine and/or the build platform relative to one another. In some implementations, the drive mechanism(s) include a second drive mechanism configured to move the light engine and/or the build platform so that the light engine moves relative to the build platform. Such relative movement may (but need not) be accomplished along the building plane defined by the build platform.

A 3D printing system may include one or more control units. Any of the control units may include memory and, one or more processors, volatile and/or non-volatile storage, data inputs and/or outputs, etc. Any of the control units can receive sensor data from sensor(s) that sense attributes of other components, such as the light engine. The one or more processors may execute computer-program instructions stored on the memory and/or storage. In some implementations, the control unit(s) comprise a first control unit that is configured to instruct the drive mechanism(s) to optimize (e.g., reduce, minimize, etc.) movement of the material transport unit and the light engine relative to the build platform. The instructions may include instructions to the first drive mechanism to change position and/or velocity of the carrier film of the material transport unit. This could include slowing the material transport unit down or speeding it up. The instructions from the first control unit may also include instructions to the second drive mechanism to move the light engine and/or the build platform so that the material transport unit and the light engine are synchronized (e.g., in time and/or space) with one another. The control unit(s) may provide instructions to only one or to two or more of the material transport unit, the light engine, and the build platform. One or more of the control units may adjust feeding rates of pattern data feeders in response to a sensor signal.

A 3D printing system can include heating systems configured to heat material layers while the material layers are on at least part of a building plane within an exposure field associated with a light engine. The heating systems may be configured to decrease viscosity of the photopolymer resin so that the material layers can be 3D printed while on the building plane. Exposure to a light source may allow the material layers to be at least partially cured during the 3D printing process. Examples of heating systems include contactless heating lamps, infrared lamps, etc.

In some embodiments, a 3D printing system includes a pre-heating plate that is configured to maintain at least a portion of the material layers at a specified temperature before they are heated by, e.g., a heating system. The pre-heating plate may, but need not, be coupled to a part of the carrier film, such as a part of the carrier film that the material transport unit moves toward the building plane. A 3D printing system may include a post-heating plate configured to maintain material layers at a specified temperature after the material layers have been heated and/or printed on.

A 3D printing system may include a guiding plate that is at least partially transparent to a wavelength of light from the light source. The guiding plate may allow light from the light source to pass through it and through the exposure field to the building plane. In some embodiments, the guiding plate guides the carrier film to a specified position relative to the building platform. Such an arrangement may create a gap of a specified width between the carrier width and the building platform to allow a material layer that is to be 3D printed and/or cured between the guiding plate and the building platform.

In various embodiments, a device is characterized by a relative movement of the light engine and the building platform in order to enable the manufacturing of 3D-structures on a large building platform, the printing area of which is a multiple of the exposure field of the light engine, in particular at least the three times the exposure field of the light engine. According to this disclosure, "relative movement" of two devices may mean that either or both of the two devices move relative to the other one. For instance, "relative movement" of a light engine and a building platform and/or a building platform may mean that the light engine and the building platform are moved relative to the other. Devices that may perform relative movement of a light engine and a building platform, to continue this example, may include a second drive mechanism and/or second drive means. For example, if a building platform were stationary, a second drive mechanism may cause a light engine to move along a displacement path. As another non-limiting and non-exclusive example, the light engine may be stationary and the building platform may be driven by a second drive mechanism to move relative to the building platform along the displacement path.

As described herein, "light" may include any electromagnetic radiation that is able to induce polymerization of a photopolymer resin. The term "light" need not be restricted to visible light, e.g., the portion of the spectrum that can be perceived by the human eye.

According to the implementations herein, a light engine may be designed to pattern light in an exposure field of the light engine to print pattern data onto a material. In some embodiments, this may involve dynamic patterning of light in an exposure field of the light engine. The patterning of light may be accomplished by a Digital Light Processor (DLP), other active mask projection systems, laser-scanner based systems to selectively project light information on the surface of a photopolymer resin. The dynamic light engine is able to generate dynamic light information (e.g., information used to provide light patterns in an exposure field to print pattern data onto a material), such as dynamic projected images, laser scanning or other zero-dimensional, one-dimensional or two-dimensional dynamic light information. In particular, the implementations herein may provide for pattern data feeder for feeding a sequence of pattern section data to the light engine at an adjustable feeding rate.

Because the exposure field of the light engine extends over a partial length of the building platform only, the light engine is provided with a sequence of sections of the entire pattern. The individual pattern section received by the light engine from the pattern data feeder are projected without delay so as to safeguard a precise control of the pattern to be printed. By controlling the feeding rate, at which the pattern sections are fed to the light engine, one controls the rate, at which the sequence of light pattern sections are emitted onto the material layer.

Feeding a sequence of pattern section data to the light engine comprises feeding control data or pattern data to the light engine, the control or pattern data being adapted to cause the light engine to emit a respective light pattern that is represented by said control or pattern data.

According to the implementations described herein, the light engine is caused to emit the sequence of light pattern sections onto the material during the relative movement of the light engine and the building platform along the displacement path. In this way, a continuous process is achieved, in which the light engine is continuously moved relative to the building platform, or vice versa, while the sequence of pattern sections are projected at a specific rate.

In such a continuous process, it is often desirable for the dynamic patterning of light by the light engine to be synchronized with the relative movement of the light engine and the building platform. Such synchronization shall result in that each pattern section is timing-wise and position-wise accurately placed relative to the building platform and in that material layers are built exactly on top of each other in an aligned manner. According to the implementations described herein, said synchronization is achieved by providing a linear encoder for sensing a position and/or a velocity of the light engine relative to the building platform, wherein a second control unit is provided for adjusting the feeding rate of the pattern data feeder based on the position or the velocity sensed by the linear encoder. In this way, the dynamic light information is projected onto the photopolymer resin so that the dynamic speed (i.e. the rate at which the sequence of pattern sections is projected, e.g. the "scrolling speed" of the pattern) of this light information matches the physical speed of the relative movement between the light engine and the building platform as best as possible.

In order to perform appropriate synchronization over the entire displacement path, a linear encoder may be configured for sensing a position and/or a velocity of the light engine relative to the building platform over the entire displacement path of the light engine relative to the building platform. Further, the linear encoder may be configured for sensing a position and/or a velocity in a continuous manner or at defined intervals. Accordingly, the second control unit are preferably configured for adjusting the feeding rate continuously or at said defined intervals.

In order to ensure high precision, the linear encoder is able to detect the actual relative position or velocity between the light engine and the building platform in an accurate way, in some embodiments, with an accuracy between 0.1 nanometers (nm) and 1.000 micrometers ($\mu$m). In various embodiments, the accuracy may be between 1 nm and 10 $\mu$m and at the same time is able to measure and feed this position or velocity information with high repetition rate to the second control unit. In some embodiments, the linear encoder is configured for detecting the relative position or velocity at a frequency of between 10 Hz and 100 MHz. In an embodiment, such a linear encoder comprises an active encoder unit (logic unit), which may interpret discrete positioning signals and which is preferably mounted to the moving unit, and a physical measurements bar or encoder bar which features the position signal information in a physical way (e.g., optical marks, electromagnetic marks, magnetic marks, etc.) and which may be mounted on the non-moving unit. The linear encoder may sense position and/or velocity data in a non-contact manner, such as optically, electromagnetically or magnetically.

In order to provide real-time position or velocity data, the linear encoder is configured to feed its position and/or velocity data to the second control unit with a maximum latency of 50 μs, preferably a maximum latency of 30 μs.

The second drive mechanism may be controlled to ensure that the relative velocity between the light engine and the building platform is as constant as possible to provide stable and uniform printing conditions. The ability of physically scaling the additive manufacturing process is benefiting from this requirement of velocity consistency. Adding mass to the moving part is helpful in facilitating control algorithms and drive engine selection to achieve constant velocity. However, achieving a constant velocity need not be a precondition for accurate additive manufacturing, since the feeding rate of the pattern data feeder can be adjusted to changes in the moving velocity of the light engine. Therefore, a sufficient dynamic light accuracy relative to the building area is also fully achieved during acceleration and deceleration phases in the movement between the light engine and the building platform, such as towards the end of the building platform.

According to some embodiments, the light engine is designed for intermittently emitting light to said exposure field at an adjustable light pulse rate, wherein the light engine is preferably configured to synchronize the light pulse rate to the feeding rate of the pattern data feeder. By intermittently turning on and turning off the light engine so as to generate light pulses, the material layer is irradiated only over a section of the available time slot, i.e. the time slot defined by the feeding rate of the pattern data feeder. In particular, the light pulses are synchronized with the feeding rate of the pattern data feeder so that a light pulse is generated each time the light engine switches (e.g., "scrolls") to a new pattern section. Since the light pulses are emitted while the second drive mechanism may cause relative movement of the light engine and the building platform, the position of the patterned light emitted onto the material layer changes during the time slot, which has a blurring effect. By emitting the light only over a section of the available time slot, such effect may be minimized.

At the same time, it may be desirable for various photopolymers, such as photopolymer formulations that can be 3D printed and/or are suitable for use in industrial/mass production applications of medical devices, such as dental appliances and/or aligners, and/or advanced photopolymer resins to receive a threshold amount of radiation energy (e.g., beyond a minimum radiation energy) in order to induce polymerization. Non-limiting examples of photopolymers formulations that this may apply to include those described in: Patent Cooperation Treaty (PCT) Patent Application Number PCT/US2019/30683, entitled "Curable composition for use in a high temperature lithography-based photopolymerization process and method of producing crosslinked polymers therefrom," by Align Technology, Inc., filed May 3, 2019; Patent Cooperation Treaty (PCT) Patent Application Number PCT/US2019/30687, entitled "Polymerizable Monomers and method of polymerizing the same," by Align Technology, Inc., filed May 3, 2019; and Patent Cooperation Treaty (PCT) Patent Application Number PCT/IB2016/00970, entitled "Dental materials using thermoset polymers," by Align Technology, Inc., filed Jul. 7, 2016. The contents of these applications are hereby incorporated by reference as if set forth fully herein.

According to an embodiment, the light engine is configured to adjust a pulse-duty factor (e.g., a factor used as the basis of a pulse duty cycle and/or ratio of pulse duration/waveform to total period of the waveform) of the light pulses. The pulse duty factor is the ratio of pulse duration to the pulse period. For example, a higher pulse-duty factor may be selected with a photopolymer material that requires a higher amount of radiation energy and a lower pulse-duty factor may be selected with a photopolymer material that requires a lesser amount of radiation energy.

In some implementations, a compromise between these competing considerations may be achieved if the pulse-duty factor is set to a value between 0.1 and 0.8.

In connection with the pattern data feeder, an embodiment provides that the pattern data feeder comprise a data storage that stores pattern data representative of a pattern of a material layer to be built on the building platform, said pattern data being associated with a length dimension of said pattern measured along the displacement path of the second drive mechanism, wherein said pattern data comprises pattern section data representative of a plurality of pattern sections of said pattern along the length of said pattern.

The pattern data may be structured as a rectangular grid of pixels comprising a plurality of rows of pixels, wherein each pattern section comprises at least one row of pixels.

If each pattern section comprises exactly one row of pixels, each row of pixels is projected onto the material layer one after the other with a frequency corresponding to the feeding rate of the pattern data feeder.

If each pattern section comprises several rows of pixels, an embodiment may provide that said sequence of pattern section data fed to the light engine represents pattern sections that are offset from each other by one row of pixels. Therefore, the pattern sections sequentially arranged in the sequence of pattern sections overlap each other and the transition from one pattern section to the following pattern section is performed by adding a new row of pixels at the front end of the exposure field and removing a row of pixels at the trailing end of the exposure field, as the light engine has moved relative to the building platform by a distance that corresponds to the dimension of one row of pixels. In this example, the light engine scrolls through the pattern with a velocity that corresponds to the movement velocity of the light engine relative to the building platform.

As mentioned earlier, a material transport unit is provided for transporting a material layer across the exposure field. According to an embodiment, the material transport unit comprises a flexible carrier film that is at least partially transparent to the light emitted by the light engine, and wherein coating mechanisms (e.g., coating blades) are arranged for coating a front side of the flexible carrier film with the material layer, the front side of the carrier film facing the building platform when moving across the exposure field. The carrier film preferably is designed as a carrier film (e.g., an endless carrier film, a continuous carrier film, a carrier film that rotates using a belt or other drive mechanism, etc.) that is coated at a location upstream of the exposure field. In some embodiments, a de-coating system may be provided downstream of the exposure field, which allows to remove eventual remainders of the photopolymer material from the carrier film before a new layer is applied. In various embodiments, a de-coating system comprises a scraper blade, which is pressed against a support plate with the moving carrier film being in between. In some embodiments, such a system collects the scraped material and delivers it back towards a storage area or storage tank.

In some embodiments, if the carrier film is not an endless film, the length thereof is adapted to the length of the building platform or the carrier film is significantly longer than the building platform.

Preferably, the light engine, the (endless) flexible carrier film and the coating mechanism(s) are arranged in or on a print head, which is movable by the second drive mechanism for causing relative movement of the print head relative to the building platform. In this way, the print head incorporates all parts that are moved relative to the building platform. Here, the building platform can be designed as a platform that is kept stationary in the length direction, while the print head is moved by the second drive mechanism.

The print head may comprise a carrier film tensioning mechanism (e.g., a mechanism that adds, removes, modifies, etc. tension to the carrier film), which is able to provide proper tensioning of the film. A sufficient tension of the carrier film is advantageous in order to obtain good resin coating and exposure results. In a preferred embodiment said tensioning mechanism is directly mounted to a roller that guides the carrier film.

Further, one or more rollers (e.g., an array of rollers) may be provided for guiding the carrier film during its duties in the said process. In, such rollers are only arranged on one side of the carrier film, e.g. at the inside of an endless carrier film, to avoid direct contact with the material layer. However, the invention also encompasses embodiments, wherein rollers are mounted on the coated side of the carrier film, if necessary in an alternative embodiment of the device. In this case, the roller surface may be adapted for contacting the material layer, e.g., by selecting a specific roller surface or texture. Optionally such rollers may be individually heated in a controlled way.

The first drive mechanism for transporting the material layer may comprise a drive engine configured to drive the material transport unit to transport one or more material layers of a photopolymer resin toward an exposure field. In some embodiments, the drive engine is controlled by a first control unit. In some embodiments, the drive engine moves the carrier film in a controlled way to synchronize the carrier film velocity to the relative movement induced by the second drive mechanism. In some embodiments, the synchronization is substantially similar, exact, etc. The drive engine may be configured to move the carrier film in a controlled way so as to exactly synchronize the carrier film velocity to the relative movement induced by the second drive mechanism. Such synchronization results in that there is no relative movement in the contacting zone of the material layer and the building platform during the relative movement of the light engine relative to the building platform.

In some embodiments, the first drive mechanism may be coupled and/or s directly mounted to one of the rollers of the carrier film system. For instance, more than one of the rollers are connected to the drive engine, wherein for example one driven roller may be near the coating zone and another driven roller may be the guiding roller.

As another example, a guiding mechanism for guiding the carrier film is provided, such as a steerable guiding roller system, which is able to steer the carrier film in terms of drifting issues. As yet another example, such a roller is directly connected to the carrier film motor drive. Optionally such a mechanism can be heated in a controlled way.

As yet another example, a guiding plate may be arranged in the exposure field between the light engine and the carrier film to define a gap between the carrier film and the building plane and wherein the guiding plate is at least partially transparent to the light emitted by the light engine. The guiding plate may be arranged such that the carrier film is in contacting relationship with the guiding plate when the carrier film moves across the exposure field, thereby guiding the carrier film. Thus, the guiding plate is contacting the back side of the flexible carrier film, the back side of the carrier film facing away of the building platform when moving across the exposure field. The guiding plate may comprise a planar surface on its side facing the building platform so that a gap is formed between the two parallel planes, the planar surface of the guiding plate and the building plane of the building platform. The width of the gap defines the material layer thickness that is exposed to the radiation of the light engine in the exposure field.

In some embodiments, the guiding plate is adjustable in a direction perpendicular to the building plane, in order to adjust the width of the gap, if desired.

Considering the high viscosity of various photopolymers (such as photopolymer formulations that can be 3D printed and/or are suitable for use in industrial/mass production applications of medical devices, such as dental appliances and/or aligners), the device may preferably comprise heating system(s) for controlling the temperature of the material layer. In particular, the temperature of the material layer may be controlled in the exposure field, since the chemical reactivity of photosensitive polymers is directly influenced by their temperature. Controlling the temperature in the exposure field can be reached by heating the guiding plate which guides the carrier film in the exposure field. Accordingly, an embodiment provides that a first heating system is provided for heating the guiding plate. In particular, the heating system(s) are arranged for heating the guiding plate in the exposure field.

Since the guiding plate may be optically transparent to the wavelength or the wavelength range used for the resin curing, indirect heating system(s) may be employed. Examples of heating system(S) include hot air heating, such as heating system(s) configured to heat the surrounding air or the process gasses, heating system(s) configured to heat a transparent liquid that is pumped through the guiding plate or that surrounds the guiding plate on one side thereof, and heating system(s) comprising heating elements for conductively heating the guiding plate in areas adjacent the exposure field. According to an embodiment, the heating system (s) comprise infrared heating elements, such as infrared radiators, to heat the guiding plate from the side that faces away from the building platform. For instance, the infrared radiation may hit the guiding plate first before hitting the photosensitive material. In this connection, an embodiment provides that the guiding plate is made of a material, which is opaque or only partially transparent to infrared radiation and transparent or at least partially transparent to the radiation wavelength that is used for curing the photopolymer resin.

Another process zone to be considered for being temperature controlled is the coating zone, where the carrier film is coated with the photopolymer resin. Heating the coating zone to a specific temperature can be advantageous in order to reduce the viscosity of the photopolymer resin, wherein the viscosity of the resin is sometimes determined by its temperature. To coat the carrier film with a thin layer of the photopolymer resin, the coating mechanism(s) comprise a rakel mechanism, such as a doctor blade that is arranged on the front side of the carrier film, the carrier film being supported in the coating zone by a support plate that is arranged on the back side of the carrier film opposite the rakel mechanism. Preferably, a heating element is provided for heating the rakel mechanism, such as the doctor blade. Further, a heating element may preferably also be provided for heating the support plate. When heated, the support plate transfers the heat to the carrier film, which in turn heats the photopolymer resin that is coated onto the carrier film in the coating zone.

Furthermore, a pre-heating and post-heating zone may be implemented around the exposure field to support the resin heating and in consequence to lower the resin viscosity before the resin is moved by the carrier film into the exposure field. The post-heating zone can help adjusting smooth temperature gradients and add additional process stability. In this connection, an embodiment may provide that second heating system(s) are arranged between the coating mechanism(s) and the exposure field for heating the material layer.

Preferably, additional heating system(s) are provided for controlling the temperature of the building platform, since the resin temperature would drop significantly, if the resin were applied to a cold building platform. This is of significance for the first layers printed onto the building platform due to the direct contact of such layer(s) with the surface of the building platform. Later in the printing process, heating of the building platform is also preferable, since thermal expansion phenomena of the building plate would negatively influence the printing accuracy over time, if the building platform temperature were not controlled properly. The heating of the building platform may be achieved by using heating pads or other heating elements to heat the building platform or a carrier element for carrying the building platform.

In this connection, according to some embodiments, the building platform is arranged to be exchangeable. For instance, the building platform may be exchangeably arranged on or connected to a carrier element. This allows the building platform to be easily removed after the printing process has been concluded and a new building platform to be installed for the next printing process. According to some embodiments, the process of removing and installing a building platform may be conducted automatically, such as by a coupling unit configured to couple the building platform and the carrier element to one another and/or means for fixing the building platform onto the carrier element that can be activated and released by an electrical signal. In a preferred embodiment the building platform is exchangeably fixed to the carrier element by a vacuum device or by an electro-magnetic device In particular, at least one channel is provided at the surface of the carrier element, which is connected to a vacuum source that is able to generate a negative pressure between the building platform carrier and the exchangeable building platform. In such an embodiment the exchangeable building platform may be a simple sheet metal plate. Furthermore, such a carrier element could also comprise automatic building platform exchange mechanism. In a preferred embodiment, the exchange mechanism comprises holes or gaps in the carrier element that are aligned with protrusions that are arranged below the carrier element. Upon a downwards movement of the carrier element, the protrusions penetrate the holes or gaps from below and lift the building platform form the carrier element. In an embodiment, such protrusion elements comprise wheels or carrier belt mechanisms, which are not only able to lift the building platform from the carrier element, but which are also able to move or haul the building platform out of the printing zone. In some embodiments, such a mechanism can be part of an automated building platform exchange mechanism, which is beneficial for autonomous printing procedures.

In an embodiment, the carrier element consists of a metal plate that has heating elements installed on it (e.g. on the bottom and/or on the side thereof).

According to some embodiments, the building platform and the transport unit are configured for relative movement in a direction perpendicular to the building plane. For this purpose, drive mechanism(s) may be provided for causing relative movement of the transport unit and the building platform along a displacement path extending perpendicular to the building plane. By this height adjustment the width of the gap between the building platform and the resin side of the carrier film can be adjusted in order to define the layer thickness of the material layer.

Further, the relative movability of the building platform and the transport unit allows to adjust the system to print additional layers one over the other after a first layer has been printed onto the building platform. For each additional layer, the distance between the building platform and the carrier film is increased by a dimension that corresponds to a layer thickness.

In some embodiments, the building platform and the print head are movable relative to each other in two directions, along a displacement path extending parallel to the building plane and along a displacement path extending perpendicular to the building plane. In this connection, an embodiment provides that the building platform is movable in a direction extending perpendicular to the building plane, while the print head is fixed in said direction, and the print head is movable in a direction extending parallel to the building plane, while the building platform is fixed in said direction. Another (possibly but not necessarily alternative) embodiment provides that the print head is movable in a direction extending perpendicular to the building plane and the building platform is movable in a direction extending parallel to the building plane.

The embodiments described herein may show significant potential to combine the printing process with other manufacturing systems, in particular with non-lithographic additive manufacturing systems and/or with non-additive manufacturing systems. This may be due to the fact that during the lithographic additive manufacturing of parts, every volume point inside of such parts is easily addressable for other mechanical, chemical or physical fabrication steps. According to an embodiment, at least one secondary material structuring and/or material placing and/or material subtracting unit is arranged adjacent the print head, said material structuring and/or material placing and/or material subtracting unit perhaps being guided for relative movement to the building platform along a displacement path extending parallel to the building plane.

Examples of material structuring and/or material placing and/or material subtracting units include inkjet printing units, fused deposition modelling units, fiber placement or fiber coating units, drilling and boring units, soldering units, dye coating units, die bonding units, cold- and hot-plasma treatment units, such as plasma coating units, wire-bonding units, spray coating or micro-droplet units, casting units, such as a shell filling mechanism that is able to fill a printed shell with the same or another material, cutting units and multi-purpose pick-and-place units such as robotic arms or other physical object manipulators. Such process enhancement units could interact with the actual lithographic printing process in terms of being physically connected to the print head and thus using the same or an additional positioning control system, such as the linear encoder, or they could move individually along the building platform area by one or more same or different physical guiding systems and/or means of the same or different physical guiding systems as the print head or the building platform. Some of the fabrication and manipulation systems mentioned above could also be mounted on robotic arms or other object manipulation systems that can move in lateral directions or in three-dimensional manner or in combined ways using mechanical joints and/or fixed or moving mounting points or joints.

BRIEF DESCRIPTION OF THE FIGURES

Specific embodiments are provided as follows.

DETAILED DESCRIPTION

Figure 1:
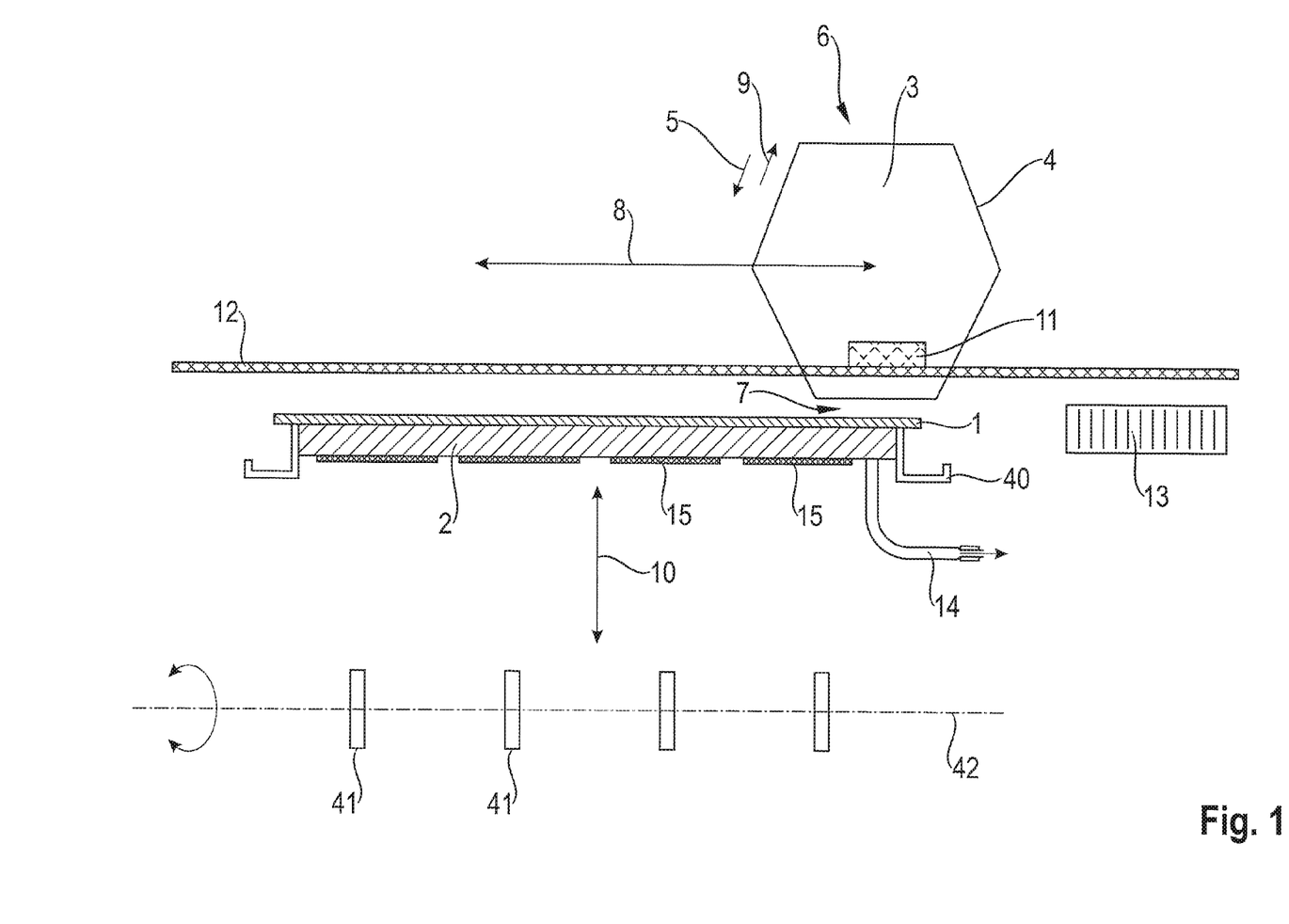
FIG. 1 illustrates a first implementation of a printing device in accordance with an embodiment.

In FIG. 1, a building platform 1 is exchangeably arranged on a plate-like carrier element 2. A print head is denoted by reference numeral 3 and may comprise a flexible carrier film 4 that is designed as a continuous belt (e.g., an endless belt). In a coating zone 6, the carrier film 4 can be coated with a layer of a photopolymer resin. The carrier film 4 is driven for movement according to arrow 5 or 9 by a first drive mechanism in order to continuously transport a material layer across the exposure field 7 of a light engine (shown in FIG. 2). The light engine is designed for the dynamic patterning of light in the exposure field 7 and may induce polymerization of the photopolymer resin layer that is arranged on the carrier film 4 between the carrier film 4 and the building platform 1.

A second drive mechanism may be provided for causing movement of the print head 3 relative to the building platform 1 along a displacement path 8 extending parallel to the building plane of the building platform 1. A first control unit is provided for controlling the circulating velocity of the carrier film 4 to be identical to the velocity of the print head 3 relative to the building platform 1 resulting in that there is no relative movement of the material layer and the building platform 1 in the exposure field 7 during the relative movement of the print head 3 relative to the building platform 1. In some embodiments, the carrier film 4 feeds the material layer into the exposure field 7 at the same velocity as the print head moves along the building platform 1 in the direction of the arrow 8. For this purpose, the carrier film 4 circulates according to the arrow 5, if the print head 4 moves from the right to the left, and the carrier film 4 circulates according to the arrow 9, if the print head 4 moves from the left to the right. Each pass of the print head 3 over the building platform 1 (either from right to left or in the reverse direction) creates a layer of solidified material on the building platform 1 or the semi-finished work piece, wherein after each pass the building platform 1 is lowered in the direction of the arrow 10, in order to allow the creation of solidified layers one over the other. However, in some embodiments, the print head 3 may travel in one direction along the arrow 8 for printing a new layer and uses the reverse travel only for moving back to its initial position. In such a configuration, the building platform 1 is temporarily lowered more than one layer thickness to enable the print head 3 to travel back to its initial position and subsequently, the building platform 1 is lifted back to the next layer printing position after the print head 3 has reached its initial position. In such a configuration, the carrier film 4 circulates sonly according to one of the arrows 5 or 9 to perform the printing process.

Each layer may be structured according to a defined pattern that is determined by the pattern data fed to the light engine. In order to allow a continuous process, in which the print head 3 is moved along the building platform 1 in a continuous way, e.g., without interrupting the linear movement of the print head 3 over the entire length of the component to be printed, pattern data feeder are provided for feeding a data sequence of pattern section data to the light engine for causing the light engine to emit a sequence of pattern sections during the movement of the print head 3 relative to the building platform 1.

In order to achieve desired accuracy of the printing process, the feeding rate of the pattern data feeder is synchronized with the movement speed of the print head 3. To this end a linear encoder 11 may be provided on the print head 3 that is moved along a stationary linear encoder bar 12 so as to sense the position and/or the velocity of the print head 3 relative to the building platform 1. The feeding rate of the pattern data feeder is controlled based on the position and/or velocity signal obtained by the linear encoder 11. Said control process is carried out continuously or at a high frequency in order to achieve synchronization over the entire movement path of the print head 3.

The device may comprise a calibrator 13 in order to enable optical measurements of the light engine. Such measurements could be realized in a manual or automatic way. The calibrator 13 may comprise various optical elements, such as camera systems (e.g. in the visible or UV range), photosensors (e.g. for signal timing or positioning control systems or for light or radiation intensity measurements). With such systems also focus plane measurements and potential stitching phenomena could be investigated, e.g., stitching zone phenomena when multiple dynamic light engines are combined to increase the physical extension of the building area of the process or to enable higher amounts of light energy in an exposure field to increase the process throughput.

Further, a resin overflow collector 40 may be arranged at both ends or all sides of the building platform 1 in order to collect superfluous resin.

Further, a vacuum device may be provided for releasably fixing the building platform 1 to the carrier element 2. To this end, a vacuum line 14 may be connected to the carrier element 2. Alternatively, magnetic means such as electormagnetic elements may be provided to secure a building platform 1 on top of the carrier element 2.

Heating pads 15 are arranged on the underside of the carrier element 2, in order to heat the carrier element 2 and thus the building platform 1.

An exchange mechanism for exchanging the building platform 1 comprises wheels 41 or other conveying elements, the wheels 41 being support to rotate about rotation axis 42. Upon raising the exchange mechanism towards the building plate, the wheels 41 protrude through slots (not shown) provided in the carrier element 2 and upon contact with the underside of the building platform 1 lift the building platform from the carrier element. Rotation of the wheels 41 then causes the building platform to me conveyed out of the printing zone.

Figure 2:
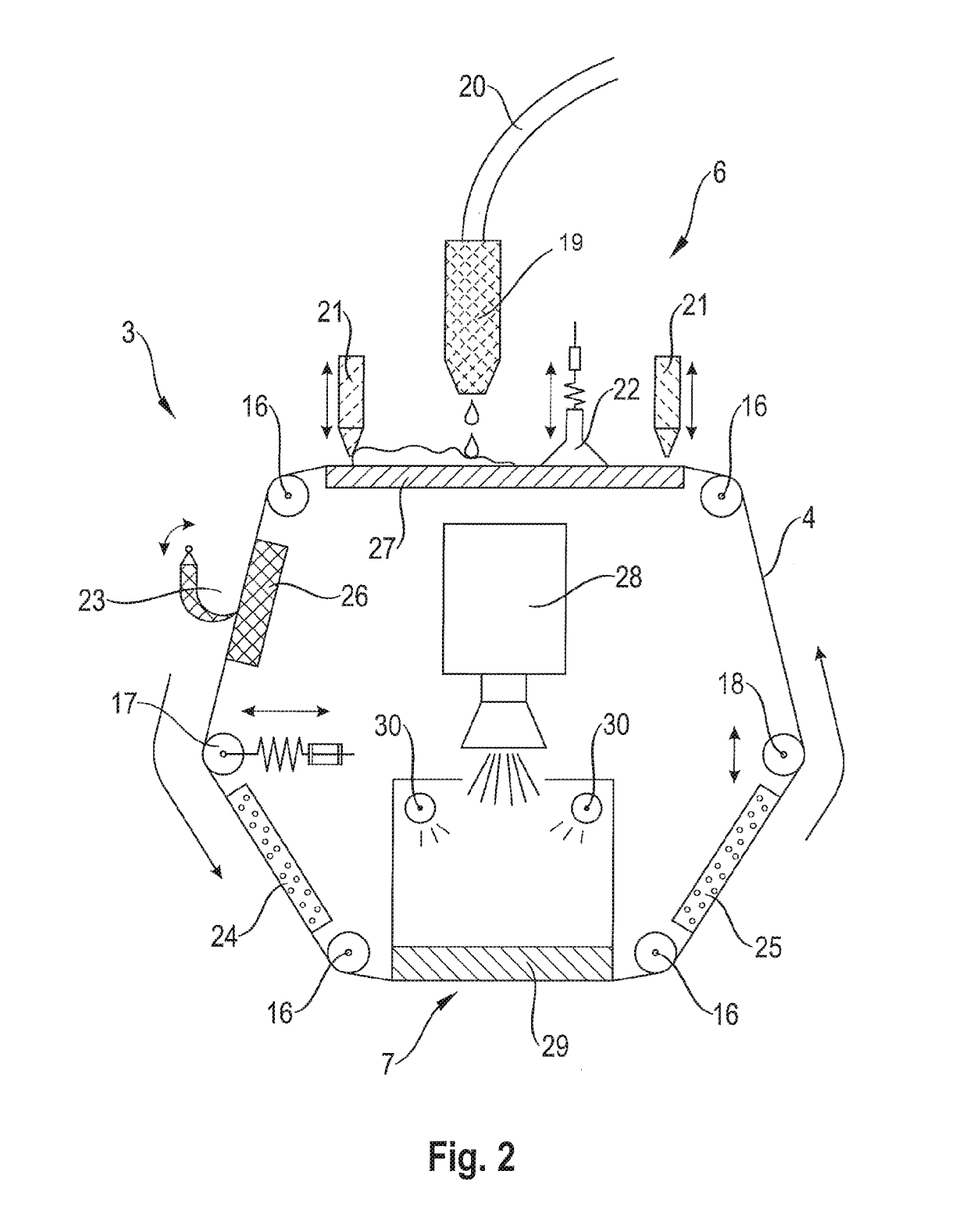
FIG. 2 illustrates a print head for use in the device of FIG. 1.

The print head 3 is shown in greater detail in FIG. 2. The print head 3 comprises an endless carrier film 4 that is guided to circulate along a closed path. The carrier film 4 is guided by a plurality of rollers, including deflection rollers 16, a tension roller 17 and an adjustable roller 18. In the coating zone 6, a nozzle 19 is provided that is connected to a resin feeding hose 20. The nozzle 19 ejects a photopolymer resin onto the carrier film 4. In an embodiment, the resin is ejected as a result of an overpressure (e.g., pressure beyond an acceptable threshold) in the hose 20 and the nozzle 19 when compared to the environment, wherein the overpressure may be created by mechanical or pneumatic systems to pump the viscous photopolymer resin from a storage tank towards the coating zone 6. In some embodiments, such coating mechanisms, including the storage tank, the hose 20 and the nozzle 19, may be heated in a controlled way.

A coating blade 21 serves to define a material layer of a defined thickness on the carrier film 4. The coating blade 21 is adjustable in the height direction in order to adjust the desired layer thickness. Further, a scraper 22 is provided to refresh or mix the material in the coating zone 6. In various embodiments, the scraper 22 may be heated in a controlled way. A support plate 27 is arranged at the back side of the carrier film 4 in the coating zone 6. The support plate 27 may function as a heating element, if needed.

A de-coating system denoted by reference numeral 23 may operate to de-coat e.g., remove material from) the carrier film 4 for various purposes during process cleaning or material exchange procedures. The de-coating system 23 may comprise a scraper blade, which is pressed against a support plate 26 with the moving carrier film 4 being in between.

Heating elements may be provided for keeping or heating the material layer at an elevated temperature, including a pre-heating plate 24 and a post-heating plate 25. Depending on the movement direction of the carrier film 4, the function of said heating plates as being a pre- or post-heating plate may switch. As an example, if the carrier film 4 were rotating in a counter-clockwise direction, the element 24 may operate as a pre-heating plate and the element 25 may operate as a post-heating plate; conversely, if the carrier film 4 were rotating in a clockwise motion, the element 25 may operate a pre-heating plate and the element 24 may operate a post-heating plate.

The light engine 28 of the print head 3 is denoted by the reference numeral 28 and emits light into an exposure field 7. In the exposure field 7 a guiding plate 29 is arranged that is at least partially transparent to the wavelength of the light emitted by the light engine 28. The guiding plate is arranged on the back side of the carrier film 4 and serves to guide the carrier film 4 so as to define a precise position of the carrier film 4 relative to the building platform 1 with a precisely defined gap (e.g., a gap having a thickness of a specified amount) being arranged between the carrier film 4 and the building platform 1. The transparent guiding plate 29 is heated by a contactless heating system comprising infrared lamps 30.

Figure 3:
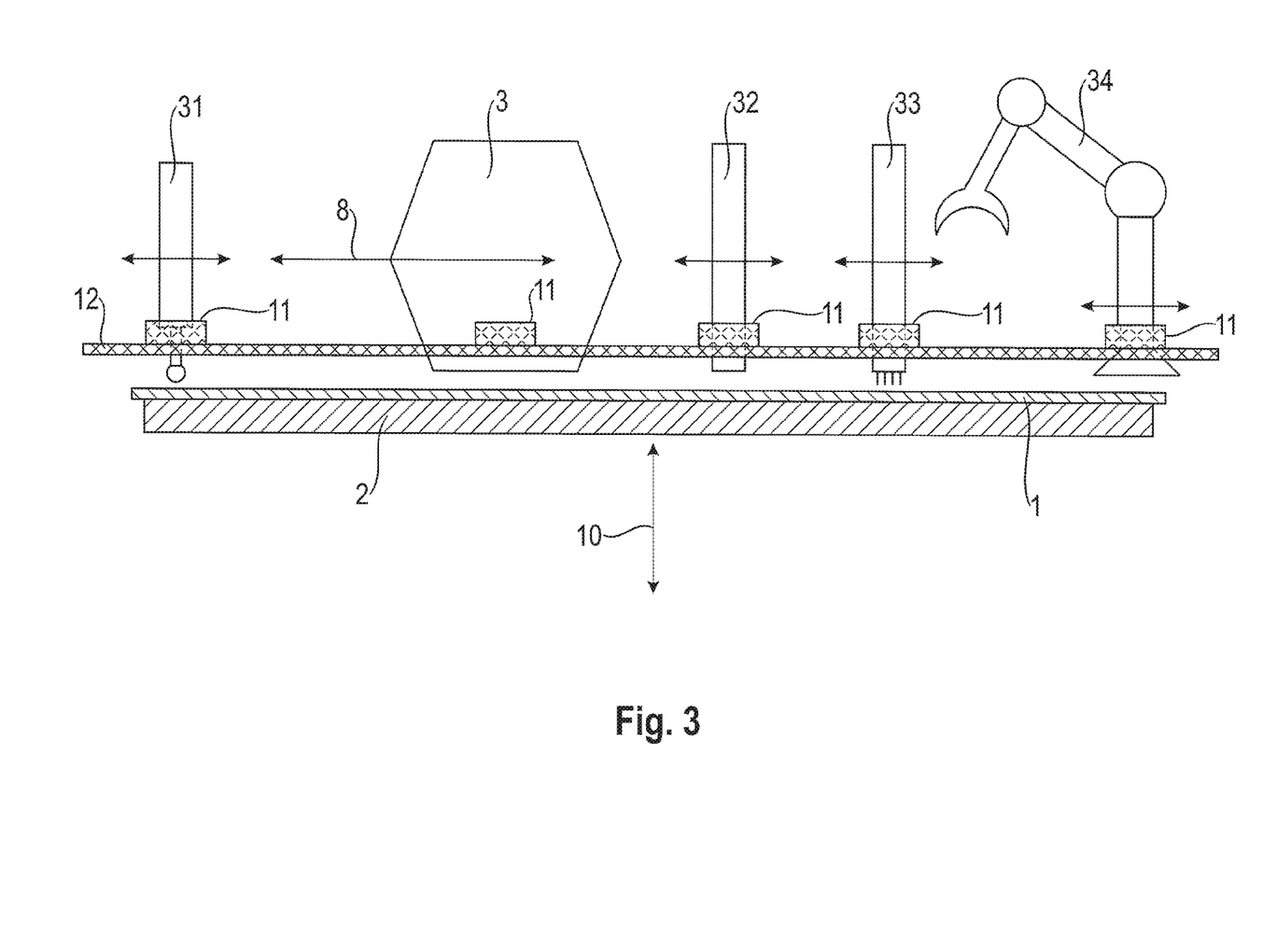
FIG. 3 illustrates a second exemplary embodiment of a printing device.

In a complementary embodiment according to FIG. 3, one or more material management units (e.g., material structuring and/or material placing and/or material subtracting units) are arranged adjacent the print head 3, said material structuring and/or material placing and/or material subtracting units being guided for movement relative to the building platform 1 along the displacement path 8 extending parallel to the building plane of the building platform 1.

In some embodiments, the material management units may include a spray coating system 31, an inkjet system 32, a soldering system, a plasma coating system or a wiring system 33 and a multipurpose robotic arm 34. Each of these units may have its own linear encoder 11.

Figure 4:
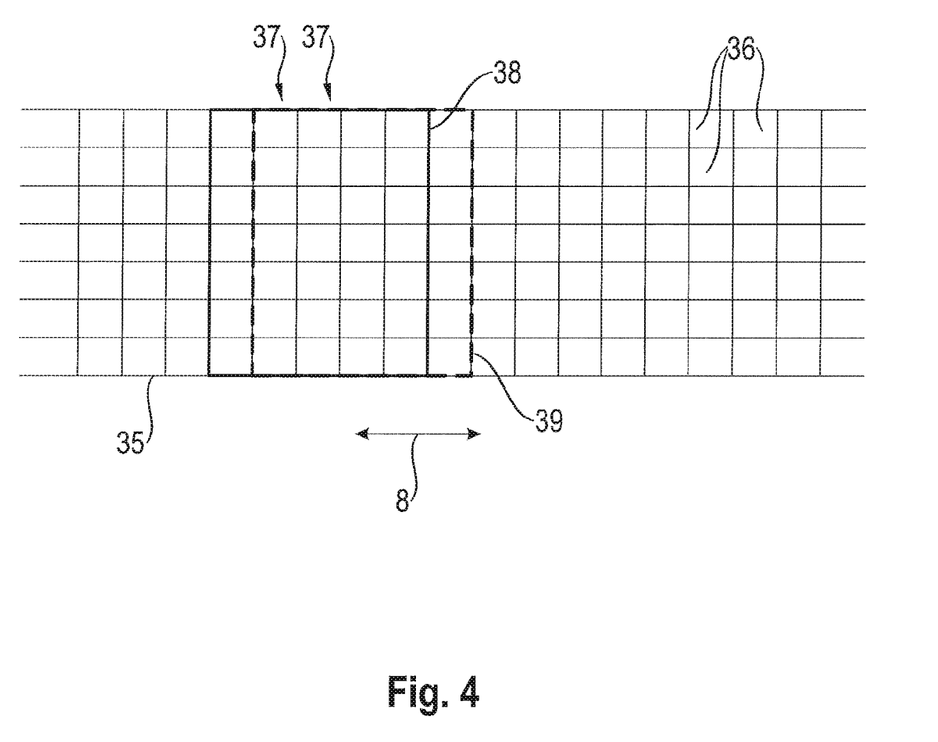
FIG. 4 illustrates pattern data structured as grid of pixels to be fed to a device.

FIG. 4 schematically illustrates the structuring of the pattern data in the form of a virtual grid 35 of pixels 36 that represent the pattern to be printed in a specific layer during the printing process. The length of the pattern along a direction 8 corresponds to the length of the component to be printed. The pattern may be divided into a plurality of pattern sections that may comprise one or more rows 37 of the pattern. For example, a first pattern section is denoted by 38 and comprises five rows 37. A second pattern section is denoted by 39 and is offset by one row 37 relative to the first pattern section 38. The same applies to further pattern sections that are each offset by one row of pixels. As the print head 3 continuously moves relative to the building platform 1, the sequence of pattern sections 38, 39, etc. is fed to the light engine 28, in order to adapt the pattern to the current position of print head 3. According to some implementations, the feed rate of the sequence of pattern section is adapted to the velocity of the print head 3 as sensed by the linear encoder 11, in order to safeguard a precise printing process.

The printing process can be physically scaled in terms of maximum building platform length extending along the displacement path 8. It can further be scaled in terms of building platform width by selecting a suitable width of the exposure field, e.g., the width of the light engine (such as the length of the laser scanning line or the length of the LED or micro LED array) or by using a plurality of light engines side by side. The process can also be scaled in terms of throughput or exposure speed, since the accuracy of the printing process is independent of the relative velocity of the print head and the building platform due to the position and/or velocity measuring system that controls the feeding rate of the pattern data feeder. Although there are photochemical restraints to maximum printing velocities, these limitations are strongly material dependent and thus could vary significantly for different photosensitive substances and also for different printing conditions, such as printing temperature and atmospheric conditions (e.g. process gases).

Figure 5A:
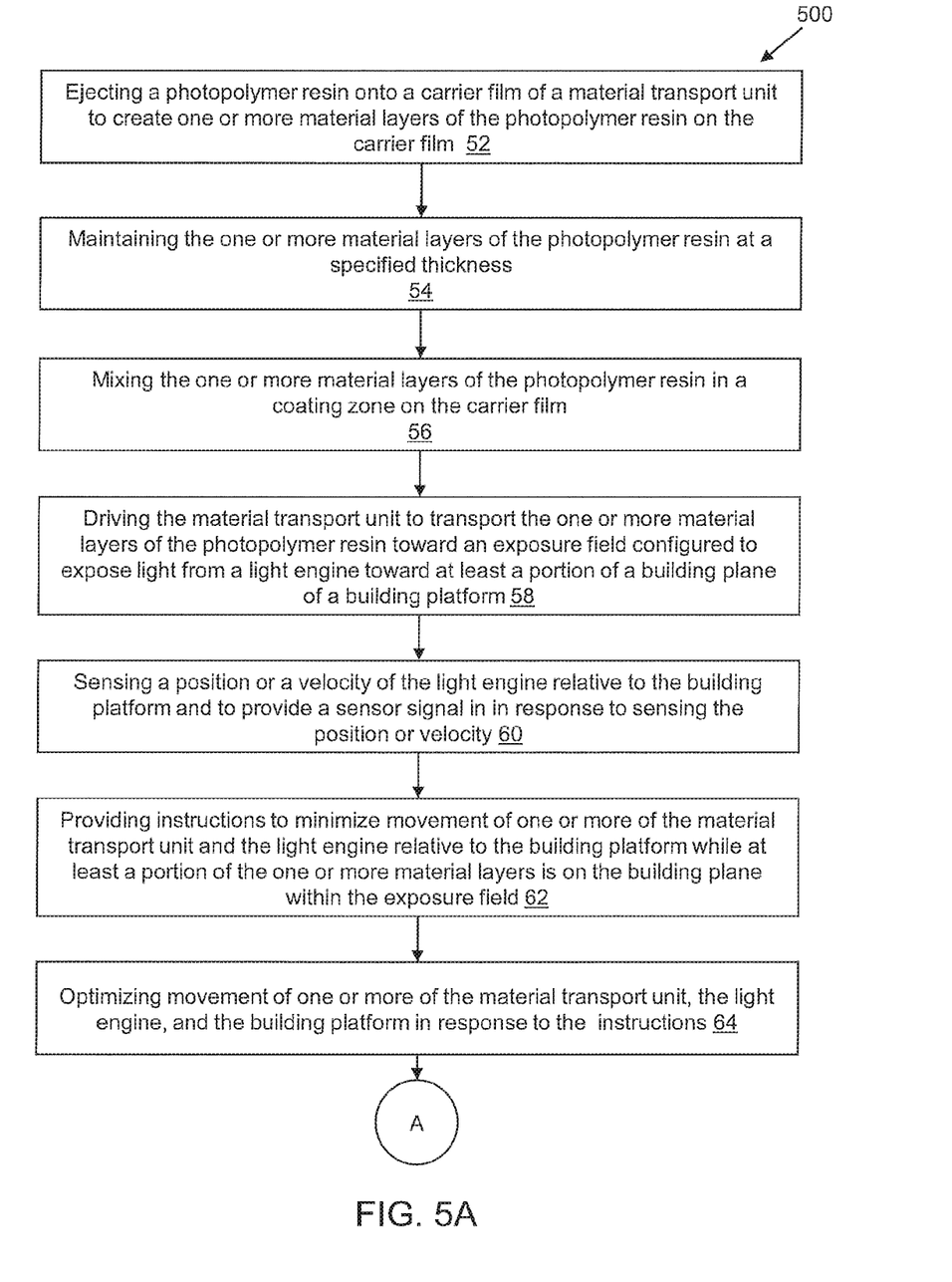
FIG. 5A and FIG. 5B illustrate a flowchart of an example method for 3D printing an object using a 3D printing system.
Figure 5B:
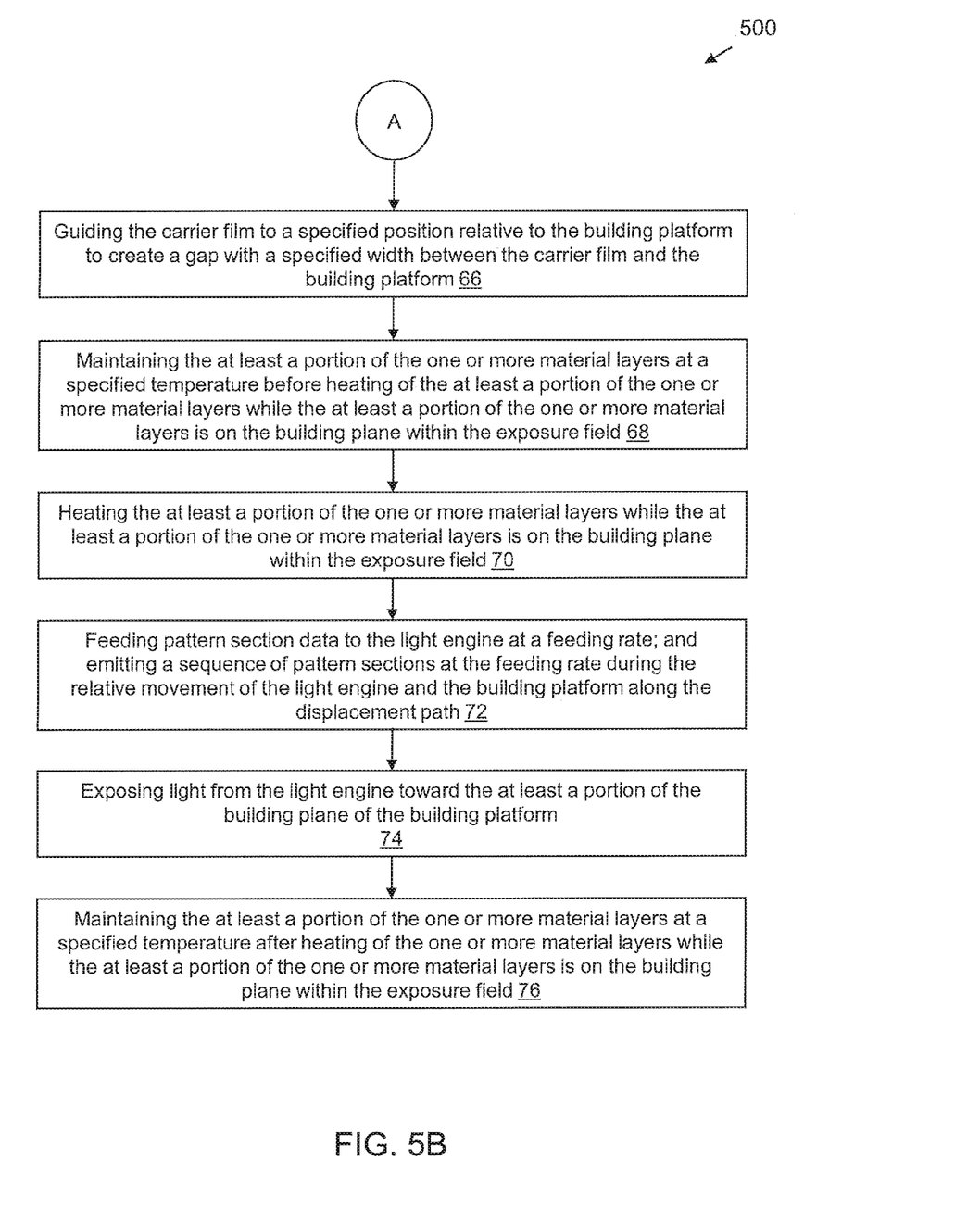

FIG. 5A and FIG. 5B illustrate a flowchart 500 of an example method for 3D printing an object using a 3D printing system. The flowchart 500 is discussed in conjunction with the example structures described in the context of FIGS. 1-4. It is noted, however, that the operations of the flowchart 500 may be executed by structures and/or devices other than those shown in FIGS. 1-4. The operations of the flowchart 500 are by way of example only, and it is noted that various implementations may employ a greater or lesser number of operations than those shown in FIG. 5A and FIG. 5B.

At an operation 502, a photopolymer resin may be ejected onto a carrier film of a material transport unit to create one or more material layers of the photopolymer resin on the carrier film. In some embodiments, the nozzle 19 may eject photopolymer resin onto the coating zone 6 on the carrier film 4. As noted herein, this may occur on a surface of the carrier film 4 adjacent to the support plate 27 and/or other convenient surfaces of the carrier film.

At an operation 504, the thickness of the one or more material layers may be maintained at a specified thickness. In some embodiments, maintaining the thickness of the one or more material layers could involve removing at least a part of those material layers to level them. Referring to FIG. 2, the coating blade 21, for instance, may operate to maintain the material layers at a desired thickness, e.g., by removing and/or leveling the material layers.

At an operation 506, the one or more material layers may be mixed in a coating zone on the carrier film. Referring to FIG. 2, the scraper 22, for instance, may operate to mix material layers on the coating zone 6 of the carrier film 4.

At an operation 508, the material transport unit may be driven to transport the one or more material layers toward an exposure field that is configured to expose light from a light source toward at least a portion of a building plane of a building platform. Referring again to FIG. 2, the carrier film 4 may be driven by a first drive mechanism, depending on embodiment, along the arrow 5 or the arrow 9 to transport the one or more material layers deposited on the coating zone 6 toward a building plane on the building platform 1 and/or toward the exposure field 7 associated with the light engine 28. As noted herein, other drive mechanisms may be used to drive the material layers toward an exposure field and/or a building plane as well.

At an operation 510, a position or velocity of the light engine may be sensed relative to the building platform. A sensor signal may be provided in response to the sensing of the position or velocity of the light engine. Referring to FIG. 1 and FIG. 2, the linear encoder 11 may operate to sense position/velocity of the light engine 28 relative to the building platform 1. As noted herein, the linear encoder 11 may provide sensor signals to control units, which may reside internally and/or be coupled to the linear encoder 11. In some embodiments, the linear encoder 11 may take optical measurements of the light engine 28 in order to derive position/velocity measurements. As noted herein, a control unit may adjust feeding rates of a pattern data feeder in response to the sensor signal.

At an operation 512, instructions to optimize movement of the material transport unit or the light engine relative to the building platform while the one or more material layers are on the building plane within the exposure field may be provided. A control unit (possibly external to or residing within the linear encoder 11) may be configured to provide instructions to optimize movement of the carrier film 4, the light engine 28, the building platform 1, or some combination thereof to optimize their movement relative to one another. In some embodiments, this may involve minimizing relative movement and/or synchronizing their movement so that the carrier film 4, the light engine 28, and/or the building plane 1 are synchronized in position and/or velocity.

At an operation 514, the movement of the material transport unit, the light engine, and/or the building platform may be optimized in response to the instructions. For instance, the movement of the carrier film 4, the light engine 28, and/or the building platform 1 may be optimized (e.g., minimized, etc.) so that the carrier film 4, the light engine 28, and/or the building plane 1 are synchronized in position and/or velocity. As noted herein, the tension roller 17 and/or the adjustable roller 18 may operate, in response to the instructions, to modify positions/velocities of the carrier film. The print head 3 similarly may operate, in response to the instructions, to modify positions/velocities of the light engine 28. In some embodiments, the motion of the tension roller 17 and/or the adjustable roller 18 is synchronized with the motion of the print head 3 to optimize movement between the carrier film 4 and the light engine 28 relative to the building platform 1.

At an operation 516, the carrier film may be guided to a specified position relative to the building platform to create a gap with a specified width between the carrier film and the building platform. For instance, the carrier film 4 may be guided to a specified position relative to the building platform to create a gap with a specified width between the carrier film 4 and the building platform 1. This gap may allow for 3D printing and/or selective curing (described in detail herein) between the carrier film 4 and the building platform 1.

At an operation 518, the one or material layers may be maintained at a specified temperature they are heated within the exposure field. As an example, the pre-heating plate 24 if the carrier film 4 is moving along arrow 5 (or alternatively the element 25 if the carrier film is moving along arrow 9) may operate to heat the material layers before they are heated by the contactless heating system(s) 30 within the exposure field 7.

At an operation 520, at least a portion of the material layers may be heated while on the building plane within the exposure field. In some embodiments, the contactless heating systems 30 may heat the material layers while they reside on the building plate 1 within the exposure field 7.

At an operation 522, pattern section data may be fed to the light engine at a feeding rate. A sequence of pattern sections may be emitted at the feeding rate during the relative movement of the light engine and the building platform along the displacement path. In some embodiments, a pattern data feeder may feed pattern section data to the light engine 28 at a feeding rate. As noted herein, the feeding rate may be controlled by a control unit coupled to or internal to the linear encoder 11. This may occur along a displacement path (e.g., displacement path 8) or other path.

At an operation 524, light from the light engine may be exposed the at least a portion of the building plane of the building platform. In some embodiments, the light engine 7 may operate to expose light (e.g., through the guiding plate 29) toward the building platform 1. Advantageously, due to positioning and/or heating of the material layers, such light from the light engine 7 may operate to 3D print materials, even those with formulations with viscosities that were traditionally difficult to 3D print.

At an operation 526, the at least a portion of the material layers may be maintained at a specified temperature (possibly, but not necessarily the same as the specified temperature maintained before photo curing) after they are heated and/or cured. As noted herein, depending on direction the post-heating plate 25 or the element 24 may perform this operation.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "some embodiments", "various embodiments", "certain embodiments", "other embodiments", "one series of embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the embodiments is intended to be illustrative, but not limiting, of the scope, which is set forth in the following claims.

The invention claimed is:

1. Device for the lithography-based additive manufacturing of three-dimensional structures, comprising:
    a building platform defining a building plane;
    a light engine configured for dynamic patterning of light in an exposure field of said light engine;
    a material transport unit comprising first drive means configured to transport a material layer across the exposure field;
    second drive means configured to cause relative movement of the light engine with respect to the building platform along a displacement path extending parallel to the building plane;
    first control means configured to control said first and second drive means so that there is no relative movement of the material layer and the building platform in said exposure field during said relative movement of the light engine relative to the building platform;
    pattern data feeding means configured to feed a sequence of pattern section data to the light engine at an adjustable feeding rate for causing the light engine to emit a sequence of pattern sections at said feeding rate during said relative movement of the light engine and the building platform along the displacement path;
    a linear encoder configured to sense a position and/or a velocity of the light engine relative to the building platform; and second control means for adjusting the feeding rate of the pattern data feeding means based on the position or the velocity sensed by the linear encoder.

2. A device according to claim 1, wherein the light engine is configured to intermittently emit light to said exposure field at an adjustable light pulse rate.

3. A device according to claim 2, wherein the light engine is configured to synchronize the light pulse rate to the feeding rate of the pattern data feeding means.

4. A device according to claim 2, wherein the light engine is configured to adjust a pulse-duty factor of the light pulses, wherein the pulse-duty factor is set to 0.1 to 0.8.

5. A device according to claim 1, wherein the pattern data feeding means comprise a data storage configured to store pattern data representative of a pattern of a material layer to be built on the building platform, said pattern data being associated with a length dimension of said pattern measured along the displacement path of the second drive means, wherein said pattern data comprises pattern section data representative of a plurality of pattern sections of said pattern along the length of said pattern.

6. A device according to claim 5, wherein the pattern data is structured as a rectangular grid of pixels comprising a plurality of rows of pixels, wherein each pattern section comprises at least one row of pixels.

7. A device according to claim 6, wherein said sequence of pattern section data fed to the light engine represent pattern sections that are offset from each other by one row of pixels.

8. A device according to claim 1, wherein the material transport unit comprises a flexible carrier film that is at least partially transparent to the light emitted by the light engine, and wherein coating means are configured to coat a front side of the flexible carrier film with the material layer, the front side of the carrier film facing the building platform when moving across the exposure field.

9. A device according to claim 8, wherein the light engine, the flexible carrier film and the coating means are arranged in or on a print head, which is movable by the second drive means.

10. A device according to claim 9, wherein a guiding plate is arranged in the exposure field between the light engine and the carrier film and configured to define a gap between the carrier film and the building plane and wherein the guiding plate is at least partially transparent to the light emitted by the light engine.

11. A device according to claim 10, wherein the guiding plate is adjustable in a direction perpendicular to the building plane.

12. A device according to claim 10, wherein first heating means are provided and configured to heat the guiding plate.

13. A device according to claim 8, wherein second heating means are arranged between the coating means and the exposure field and configured to heat the material layer.

14. A device according to claim 1, wherein third drive means are provided and configured to cause relative movement of the transport unit and the building platform along a displacement path extending perpendicular to the building plane.

15. A device according to claim 1, wherein at least one secondary material structuring unit and/or material placing unit and/or material subtracting unit is arranged adjacent the print head, said at least one secondary material structuring unit and/or material placing unit and/or material subtracting unit configured to be guided for relative movement to the building platform along a displacement path extending parallel to the building plane.

* * * * *